US012560703B2

(12) United States Patent
Kuschk et al.

(10) Patent No.:    US 12,560,703 B2
(45) Date of Patent:        Feb. 24, 2026

(54) GENERATING POINT CLOUDS BASED UPON RADAR TENSORS

(71) Applicant: GM Cruise Holdings LLC, San Francisco, CA (US)

(72) Inventors: Georg Kuschk, Garmisch-Partenkirchen (DE); Marc Unzueta Canals, Munich (DE); Sven Möller, Lübbecke (DE); Michael Meyer, Munich (DE); Karl-Heinz Krachenfels, Garmisch-Partenkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 616 days.

(21) Appl. No.: 17/899,787

(22) Filed: Aug. 31, 2022

(65) Prior Publication Data

US 2024/0027610 A1        Jan. 25, 2024

(30) Foreign Application Priority Data

Jul. 20, 2022    (EP) ..................................... 22186068

(51) Int. Cl.
G01S 13/931            (2020.01)
B60W 60/00            (2020.01)
                (Continued)

(52) U.S. Cl.
CPC ...........  G01S 13/931 (2013.01); B60W 60/00 (2020.02); G01S 7/417 (2013.01); G01S 13/89 (2013.01);
                (Continued)

(58) Field of Classification Search
CPC ........ G01S 13/931; G01S 13/89; G01S 13/42; G01S 13/582; G01S 13/584; G01S 7/417;
                (Continued)

(56) References Cited

U.S. PATENT DOCUMENTS

2019/0156248 A1*    5/2019  Togashi ................ G06F 18/214
2021/0026355 A1      1/2021  Chen et al.
                (Continued)

FOREIGN PATENT DOCUMENTS

EP            3832341 A1      6/2021

OTHER PUBLICATIONS

"Extended European Search Report for European Patent Application No. 22186068.7", Mailed Date: Dec. 21, 2022.
                (Continued)

*Primary Examiner* — Vladimir Magloire
*Assistant Examiner* — Ashley Brown Raynal
(74) *Attorney, Agent, or Firm* — Honigman LLP; Matthew H. Szalach; Jonathan P. O'Brien

(57)                ABSTRACT

The technologies described herein relate to a radar system that is configured to generate point clouds based upon radar tensors generated by the radar system. More specifically, the radar system is configured to generate heatmaps based upon radar tensors, wherein a neural network receives the radar tensors as input and constructs the heatmaps as output. Point clouds are generated based upon the heatmaps. A computing system detects objects in an environment of an autonomous vehicle (AV) based upon the point clouds, and the computing system further causes the AV to perform a driving maneuver based upon the detected objects.

18 Claims, 7 Drawing Sheets

(51) Int. Cl.
    *G01S 7/41*       (2006.01)
    *G01S 13/89*     (2006.01)
    *G06F 18/214*   (2023.01)

(52) U.S. Cl.
    CPC ..... *G06F 18/214* (2023.01); *B60W 2420/408*
        (2024.01); *B60W 2554/4029* (2020.02); *B60W*
                    *2554/4041* (2020.02)

(58) Field of Classification Search
    CPC .......... B60W 60/00; B60W 2420/408; B60W
              2554/4029; B60W 2554/4041; G06F
                             18/214
    See application file for complete search history.

(56) References Cited

U.S. PATENT DOCUMENTS

| | | | |
|---|---|---|---|
| 2021/0064890 A1 | 3/2021 | Murveit et al. | |
| 2021/0156960 A1* | 5/2021 | Popov ..................... | G01S 13/89 |
| 2023/0136937 A1* | 5/2023 | Cheng ............... | A63B 24/0062 |
| | | | 342/194 |

OTHER PUBLICATIONS

Wang, et al., "RODNet: Radar Object Detection Using Cross-Modal Supervision", In 2021 IEEE Winter Conference on Applications of Computer Vision (WACV), Jan. 3, 2021, pp. 504-513.
"Response to the Extended European Search Report for European Patent Application No. 22186068.7", Filed Date: Jan. 12, 2024.

\* cited by examiner

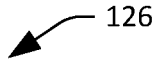
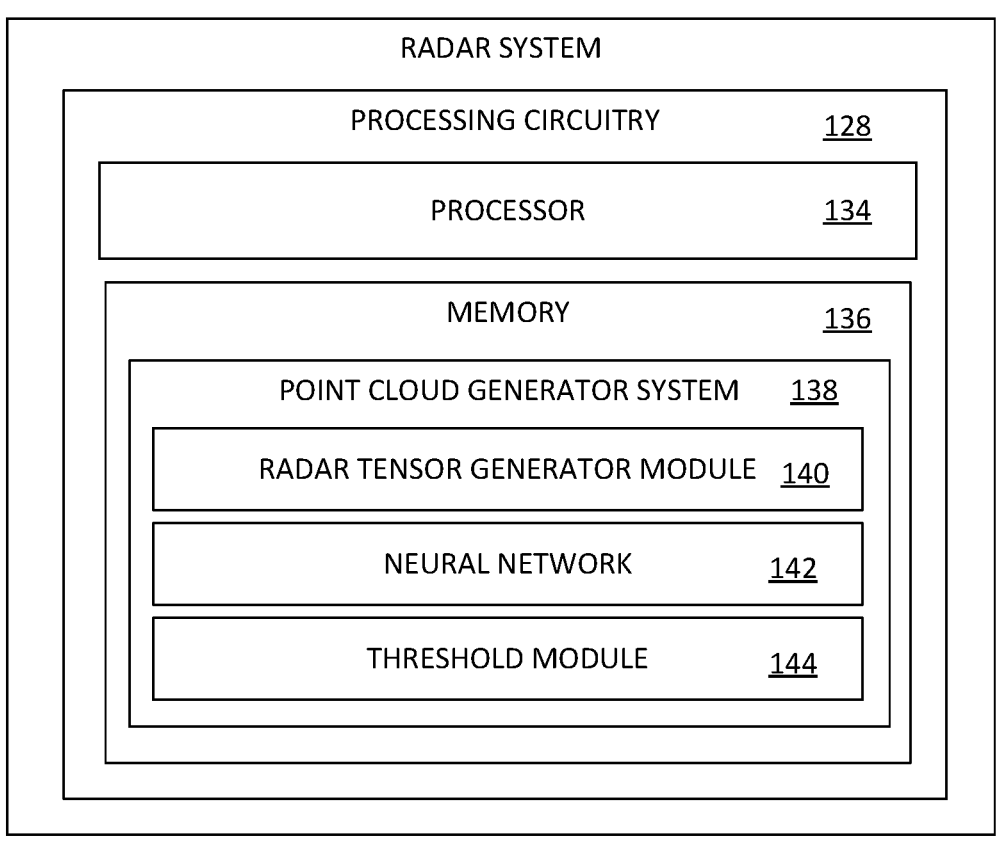
FIG. 2

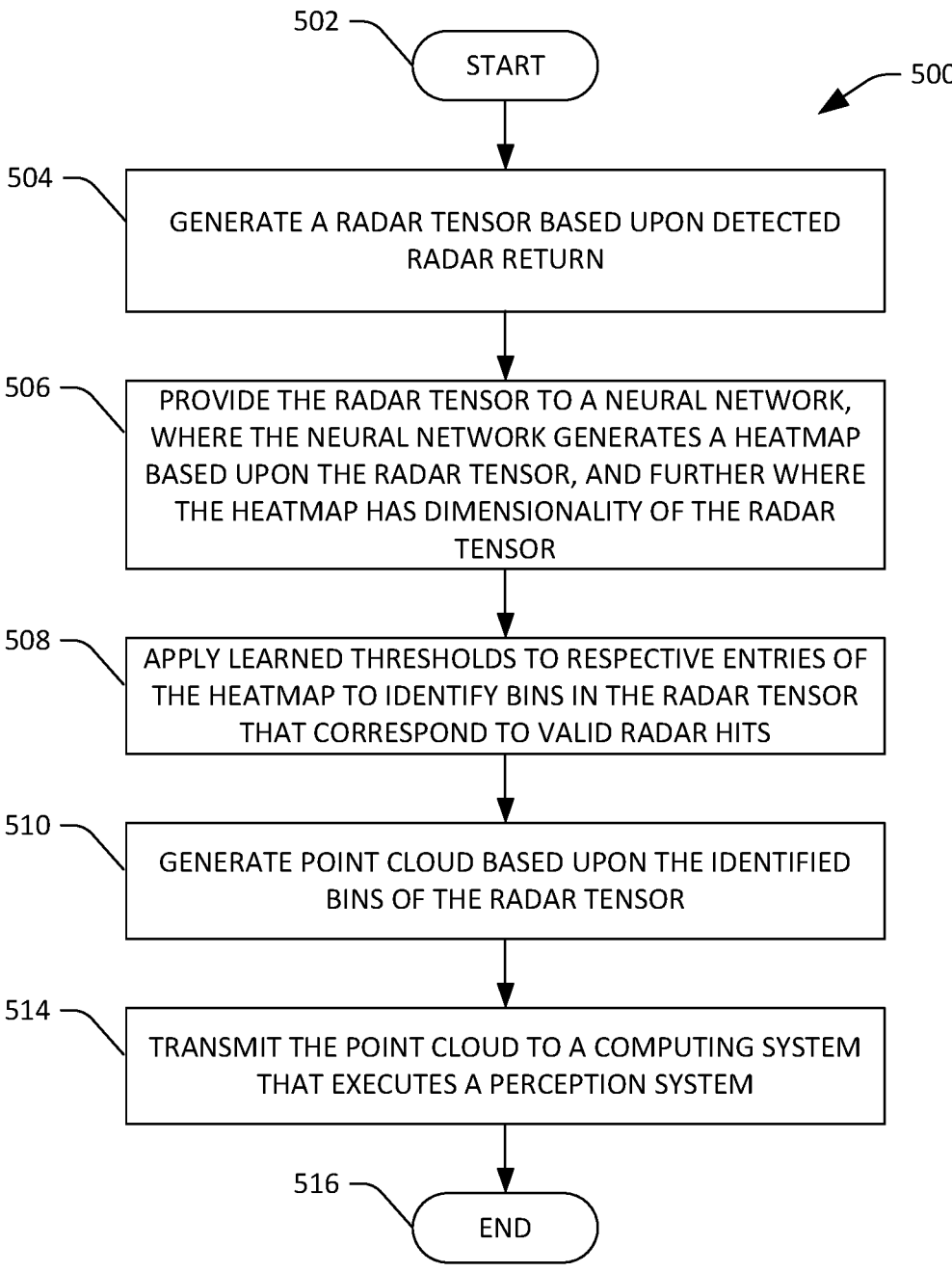

502 — START

500

504 — GENERATE A RADAR TENSOR BASED UPON DETECTED RADAR RETURN

506 — PROVIDE THE RADAR TENSOR TO A NEURAL NETWORK, WHERE THE NEURAL NETWORK GENERATES A HEATMAP BASED UPON THE RADAR TENSOR, AND FURTHER WHERE THE HEATMAP HAS DIMENSIONALITY OF THE RADAR TENSOR

508 — APPLY LEARNED THRESHOLDS TO RESPECTIVE ENTRIES OF THE HEATMAP TO IDENTIFY BINS IN THE RADAR TENSOR THAT CORRESPOND TO VALID RADAR HITS

510 — GENERATE POINT CLOUD BASED UPON THE IDENTIFIED BINS OF THE RADAR TENSOR

514 — TRANSMIT THE POINT CLOUD TO A COMPUTING SYSTEM THAT EXECUTES A PERCEPTION SYSTEM

516 — END

FIG. 5

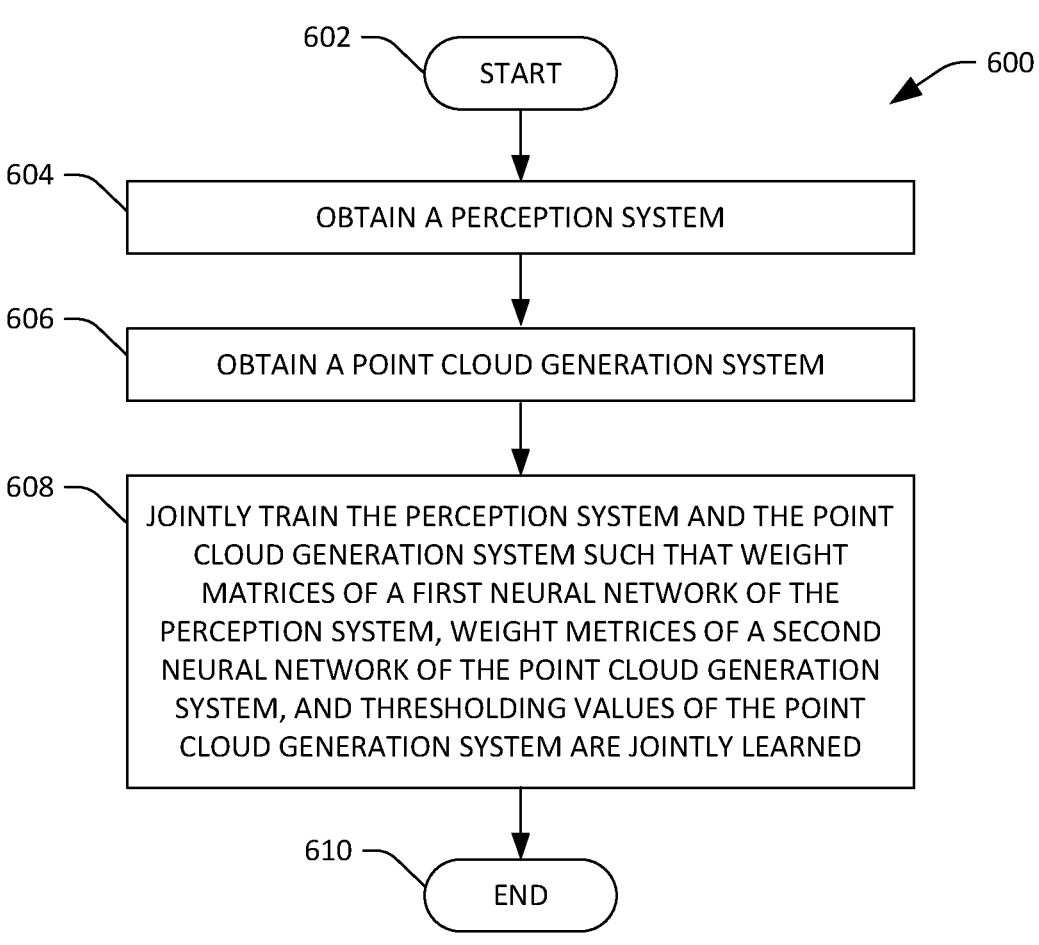

602 — START

600

604 — OBTAIN A PERCEPTION SYSTEM

606 — OBTAIN A POINT CLOUD GENERATION SYSTEM

608 — JOINTLY TRAIN THE PERCEPTION SYSTEM AND THE POINT CLOUD GENERATION SYSTEM SUCH THAT WEIGHT MATRICES OF A FIRST NEURAL NETWORK OF THE PERCEPTION SYSTEM, WEIGHT METRICES OF A SECOND NEURAL NETWORK OF THE POINT CLOUD GENERATION SYSTEM, AND THRESHOLDING VALUES OF THE POINT CLOUD GENERATION SYSTEM ARE JOINTLY LEARNED

610 — END

FIG. 6

GENERATING POINT CLOUDS BASED UPON RADAR TENSORS

RELATED APPLICATION

This application claims priority to European Patent Application No. 22186068.7, filed on Jul. 20, 2022, and entitled "GENERATING POINT CLOUDS BASED UPON RADAR TENSORS". The entirety of this application is incorporated herein by reference.

BACKGROUND

Radar sensor systems exhibit some advantages over other sensor systems such as lidar sensor systems and cameras with respect to their usage in certain contexts. For instance, compared to cameras and lidar sensor systems, radar sensor systems are more invariant to weather changes, such that data generated by a radar sensor system can be used to enable object detection in certain weather conditions (such as heavy rain or snow). In addition, radar sensor systems are able to capture velocity information nearly instantaneously. Further, radar sensor systems have a greater range than cameras and lidar sensor systems.

Radar sensor systems, for predefined time intervals, emit radar signals into a surrounding environment. The radar sensor signals reflect off objects in the environment and the radar system then detects the reflected radar signals. Conventionally, the radar sensor system is configured to construct radar tensors based upon the reflected radar signals, where a radar tensor has bins across dimensions of range, Doppler, and beam. The conventional radar system generates point clouds based upon the radar tensors and transmits the point clouds to the centralized processing device, where the centralized processing device identifies objects in the environment based upon the point clouds.

Conventionally, to generate a point cloud based upon a radar tensor, a processing device of the radar sensor performs several processing steps. First, the processing device performs peak analysis, such that bins in the radar tensor that have energies that are peaks are identified. Thereafter, with respect to the peak energies, thresholding is performed, such that bins that have the peak energies that are above a predefined threshold are selected. The processing device of the radar system treats the peak energies in these bins as representing valid radar "hits" and constructs the point cloud based upon these peak energies. The radar sensor system transmits the point cloud to the centralized processing device for further processing.

The centralized processing device of receives the point cloud from the radar sensor system and identifies objects in the environment based upon the point cloud. The centralized processing device then performs a task based upon the identified objects in the environment, where the mechanical systems may be or include a steering system, a braking system, a propulsion system, or the like.

In conventional radar sensor systems, the radar system may generate suboptimal point clouds, due to a valid radar hit not being represented by a peak energy in a radar tensor and/or a valid radar hit corresponding to a bin that has energy below the predefined threshold. Accuracy of a perception system that identifies objects based upon radar tensors is dependent upon accuracy of the point clouds. Put differently, false positives in the point cloud or failure to identify a bin that corresponds to a valid radar hit may result in the centralized processing device outputting a detection of an object when there is no object in the surrounding environment or may result in the centralized processing device failing to detect an object that is in the environment.

SUMMARY

The following is a brief summary of subject matter that is described in greater detail herein. This summary is not intended to be limiting as to scope of the claims.

Described herein is a radar system that includes processing circuitry that is configured to perform several acts, where the acts include constructing a radar tensor based upon radar returns detected by the radar system, where the radar tensor has bins that comprise energy values. The acts also include providing the radar tensor as input to a neural network, where the neural network outputs a heatmap based upon the radar tensor. The heatmap has entries that respectively correspond to the bins of the radar tensor (such that there is a one-to-one mapping of bins of the radar tensor to entries in the heatmap). The entries of the heat map include values computed by the neural network, where the values are computed based upon the energy values of the bins of the radar tensor.

The acts also include comparing a value of an entry of the heatmap with a threshold that is assigned to the entry of the heatmap, where the entry of the heatmap corresponds to a bin in the radar tensor. The acts further include assigning a label to the bin in the radar tensor based upon the comparing of the value of the entry of the heatmap with the threshold. Specifically, when the value of the entry of the heatmap exceeds the threshold, the label assigned to the bin indicates that an energy value in the bin represents a valid radar hit. Conversely, when the value of the entry of the heatmap fails to exceed the threshold, the label assigned to the bin indicates that the energy value in the bin does not represent a valid radar hit.

The acts additionally include generating a point cloud based upon the label assigned to the bin. More specifically, a point in the point cloud is computed based upon the energy value in the bin. The acts also include transmitting the point cloud to a computing system that is configured to detect and identify objects in an environment of the radar system based upon the point cloud.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of the radar system of FIG. 1 that includes a processor and a memory, where the memory has a point cloud generator system loaded therein.

FIG. 5 is a flow diagram illustrating a method for generating a point cloud based upon detected radar signals, where the point cloud is configured for use by a perception system.

FIG. 6 is a flow diagram illustrating a method for jointly training a point cloud generator system and a perception system.

DETAILED DESCRIPTION

Figure 1:
FIG. 1 is a schematic that illustrates an autonomous vehicle (AV) that includes a computing system and a radar system, where the output of a neural network executed by processing circuitry of the radar system is provided as input to a perception system executed by the computing system.

Various technologies pertaining to processing of radar sensor data are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. In addition, as used herein, the term "exemplary" refers to an example, and is not intended to indicate a preference.

Described herein are various technologies pertaining to a radar system, where raw radar data generated by the radar system is provided as input to a neural network, such as a convolutional neural network (CNN), executed in processing circuitry of the radar system. The CNN of the radar system receives as input a radar tensor and outputs a heatmap based upon the radar tensor, where the heatmap has the same dimensionality as the radar tensor, and further where a value in the heatmap is indicative of a likelihood that an energy value in a corresponding bin in the radar tensor represents a valid radar "hit". The processing circuitry of the radar system also includes a threshold module that compares values in the heatmap with respective thresholds; when a value in the heatmap exceeds a corresponding threshold, the energy value in the corresponding bin in the radar tensor is identified as representing a valid radar hit. When a value in the heatmap fails to exceed a corresponding threshold, the energy value in the corresponding bin in the radar tensor is identified as not representing a valid hit. The processing circuitry of the radar system then constructs a point cloud based upon energy values in the bins in the radar tensor identified as representing valid hits. The radar system then transmits the point cloud to a centralized computing system that is in communication with the radar system, where the centralized computing system detects and identifies objects in the environment based upon the point cloud.

The radar system described herein exhibits various advantages over conventional radar systems, in that the neural network is trained to generate a heatmap that includes values that are indicative of likelihoods that energy values in bins in a radar tensor represent a valid radar hit; this is in contrast to searching bins of the radar tensor for energy peaks, which may be prone to error.

Examples set forth herein pertain to an autonomous vehicle (AV) including a radar system that generates point clouds. It is to be understood, however, that point clouds generated by the radar system described herein can be employed in a variety of different scenarios, such as flight, in drone technologies, in monitoring technologies (e.g., security technologies), and so forth. AVs are set forth herein as one possible use case, and features of the claims are not to be limited to AVs unless such claims explicitly recite an AV.

Referring now to FIG. 1, an AV 100 is illustrated. The AV 100 can be a level 5 fully autonomous AV. While illustrated as an automobile, it is to be understood that the AV 100 may be a truck, a motorcycle, a ground-based drone, or other suitable AV, including an watercraft, an aerial craft, etc. The AV 100 includes a mechanical system 102, a computing system 104, and a radar system 126. The mechanical system 102 is configured to operate, drive, and/or maneuver the AV 100 and may include a propulsion system (e.g., an electric motor, a gas engine, a transmission, a drive train, etc.), a braking system, and a steering system as well as an electrical system (e.g., a battery, an alternator, headlights, brake lights, running lights, turn indicators, interior lights, etc.). The mechanical system 102 may also include a fuel system, an exhaust system, a cooling system, and/or a suspension system.

The computing system 104 includes a processor 106 and memory 108, where the memory includes a perception system 114 that is configured to detect and/or identify an object in an environment surrounding the AV 100 based upon data received from the radar system 126 of the AV 100. The computing system 104 is configured to output a command to the mechanical system 102 based upon the detected and/or identified object such that the AV 100 performs a driving maneuver, including, but not limited to, accelerating, decelerating, stopping, or swerving.

The radar system 126 includes processing circuitry 128 configured to transmit point clouds to the computing system 104, where the point clouds are representative of surroundings of the AV 100. The command output by the computing system 104 may be based at least in part on the point clouds transmitted from the radar system 126. While the radar system 126 is shown as being located at the front of the AV 100, with the computing system 104 being near a center of the AV 100, it is to be understood that the radar system 126 and the computing system 104 may be positioned at any suitable location within or upon the AV 100. While not illustrated, the AV 100 may also include a lidar sensor system, an ultra-sonic sensor system, an infrared sensor system, a global positioning system (GPS), an accelerometer, and/or other suitable sensor systems The radar system 126 is configured to generate a radar tensor based upon detected (reflected) radar signals, where the radar tensor includes bins across multiple dimensions, where the dimensions include range, Doppler, and beam. The radar system 126 is further configured to generate a point cloud based upon the radar tensor. In connection with generating the point cloud, the radar system 126 includes processing circuitry 128 that executes a neural network 142, where the neural network receives the radar tensor as input and generates a heatmap based upon the radar tensor, and further where the heatmap has the same dimensionality as the radar tensor. Therefore, an entry in the heatmap corresponds to a bin in the radar tensor. Entries in the heatmap include values that are indicative of likelihoods that energies in corresponding bins of the radar tensor represent valid radar "hits"; therefore, when a first entry in the heatmap includes a first value that is relatively high, then there is a relatively high likelihood that energy in a first bin in the radar tensor (where the first bin corresponds to the first entry in the heatmap) represents a valid hit (e.g., the energy in the first bin is based upon a radar signal that has reflected from an object). Contrarily, when a second entry in the heatmap includes a second value that is relatively low, then there is a relatively low likelihood that energy in a second bin in the radar tensor (where the second bin corresponds to the second entry in the heatmap) represents a valid hit.

The processing circuitry 128 of the radar system 126 is further configured to perform thresholding on the heatmap. More specifically, the entries of the heatmap are assigned threshold values, such that each entry has a threshold value assigned thereto. Thresholding comprises comparing the values of entries in the heatmap with the threshold values assigned to the entries. When the processing circuitry 128 determines that a value in an entry of the heatmap exceeds a threshold value assigned to the entry, the processor 128 identifies that an energy value in a bin of the radar tensor that corresponds to the entry of the heatmap represents a valid radar hit (e.g., energy in the bin corresponds to an object in an environment of the AV 100). Contrarily, when the processing circuitry 128 determines that a value in an entry of the heatmap does not exceed a threshold value assigned to the entry, the processor 128 identifies that an energy value in a bin of the radar tensor that corresponds to the entry of the heatmap does not represent a valid radar hit (e.g., energy in the bin does not correspond to an object in an environment of the AV 100).

The processing circuitry 128 then generates a point cloud based upon energies in bins of the radar tensor identified by the processing circuitry 128 as representing valid radar hits. The processing circuitry 128 of the radar system 126 transmits the point cloud to the computing system 104, and the perception system 114, based upon the point cloud, generates output, where the output is indicative of the presence and/or type of object in an environment of the AV 100. The perception system 114 includes a second neural network, where the second neural network receives the point cloud as input and generates the output based upon the point cloud. The perception system 114 assigns a label to the object represented in the raw radar data based upon the output, and the computing system 104 controls at least one component of the mechanical system 102, such as the propulsion system (e.g., an electric motor, a gas engine, etc.), the braking system, or the steering system to cause the AV 100 to perform a driving maneuver based upon the assigned label. In an example, the label can be a multi-dimensional state vector, wherein the vector can encode information such as position of the object in 3-dimensional space (e.g., x, y, and z coordinates), size of the object (e.g., height, width, and depth of the object), orientation of the object, and motion of the object (e.g., velocity, yaw, pitch, roll, etc.). In another example, the label can be a type of the object (e.g., vehicle, pedestrian, etc.).

The radar system 126 may be any suitable type of radar system, such as a continuous wave (CW) radar system (including a frequency modulated continuous wave (FMCW) radar system or an unmodulated CW radar system) or a pulsed radar system. The computing system 104 can be a central processing unit (CPU), a graphical processing unit (GPU), a field programmable gate array (FPGA), or any suitable combination of such computing devices. The neural network 142 of the radar system 126 may be or include any suitable type of neural network, including a convolutional neural network, a deep neural network, a recurrent neural network, a graph neural network, etc. In one embodiment, the neural network 142 of the radar system is a convolutional neural network (CNN). The perception system 114 may also be or include any suitable type of neural network. In one embodiment, the neural network of the perception system 114 is a deep neural network (DNN), a recurrent neural network (RNN), or any other suitable type of network. Further, as will be described in greater detail below, the neural network 142 of the radar system 126, the thresholding algorithm, and the neural network of the perception system 114 can be jointly trained based upon radar tensors and corresponding labels assigned thereto that identify presence and type of objects represented in the radar tensors. Such joint training results in learning of weight matrices of the neural network 142, weight matrices of the perception system 114, and threshold values jointly, such that the values are co-optimized.

Referring now to FIG. 2, a functional block diagram of the radar system 126 is depicted. The radar system 126 may include several antennas, including one or more transmitting antennas and one or more receiving antennas. The transmitting antennas are configured to emit radar signals into an environment of the AV 100 and the receiving antennas are configured to detect echo signals (reflections of the radar signals emitted by the transmitting antennas). The radar system 126 also includes the processing circuitry 128, where the processing circuitry 128 is in communication with the antennas. The processing circuitry 128 includes a processor 134 and memory 136, where the memory 136 includes instructions that are executed by the processor 134. Specifically, the memory 136 includes a point cloud generator system 138 that is configured to generate point clouds based upon detected radar returns. The point cloud generator system 138 includes a radar tensor generator module 140 that is configured to generate radar tensors based upon detected radar returns. The point cloud generator system 138 also includes the neural network 142 where, as described above, the neural network 142 is configured to generate heatmaps based upon radar tensors. The point cloud generator system 138 additionally includes a threshold module 144 that is configured to compare values of entries in heatmaps with respective threshold values assigned to the entries in connection with identifying energies in bins in the radar tensors that represent valid radar hits. The point cloud generator system 138 generates point clouds based upon the energies in bins in the radar tensors that are identified as representing valid radar hits.

Operation of the point cloud generator system 138 is now set forth. The radar tensor generator module 140 generates a radar tensor based upon radar signals detected by an antenna of the radar system 126. The radar tensor is multi-dimensional, and can include indices corresponding to range, Doppler, and beam. Thus, the radar tensor includes several bins, with each bin indexed by range, Doppler, and beam, and further where each bin includes an energy value for the bin.

The neural network 142 receives the radar tensor and generates a heatmap based upon the radar tensor. The heatmap has the same dimensionality as the radar tensor; therefore, when the radar tensor is a 10×10×10 radar tensor, the heatmap is a 10×10×10 heatmap, such that each entry in the heatmap corresponds to a respective bin in the radar tensor. Generally, the neural network 142 is trained such that values of entries in the heatmap are indicative of likelihoods that bins in the radar tensor represent valid radar hits.

The threshold module 144 is configured to compare values in entries of the heatmap with threshold values that are assigned to the entries. As noted above, when the threshold module 144 determines that a value in an entry of the heatmap exceeds a threshold value assigned to the entry, the threshold module 144 outputs an indication that energy of a bin in the radar tensor that corresponds to the entry in the heatmap represents a valid radar hit. Conversely, when the threshold module 144 determines that a value in an entry of the heatmap fails to exceed the threshold value assigned to the entry, the threshold module 144 outputs an indication that energy of a bin in the radar tensor that corresponds to the entry in the heatmap does not represent a valid radar hit. As indicated previously, threshold values assigned to entries of heatmaps can be learned during a training procedure, where the neural network 142 and the neural network of the perception system 114 are jointly trained.

Upon the threshold module 144 identifying bins in the radar tensor that correspond to valid radar hits, the point cloud generator module 138 generates a point cloud (e.g., a 2-dimensional point cloud, a 3-dimensional point cloud, etc.) based upon the energies in the identified bins in the radar tensor. As described previously, the radar system 126 transmits the point cloud to the computing system 104 of the AV 100, and the perception system 114 detects and identifies an object in the environment of the AV 100 based upon the point cloud. The computing system 104 of the AV controls the mechanical system 102 based upon detected and identified object.

Returning to the neural network 142, in an example, the neural network 142 may be trained based on a specific perception task; for instance, the neural network 142 can be trained to detect pedestrians, such that point clouds output by the point cloud generator system 138 are particularly well-suited for use in connection with detecting pedestrians. In another example, the neural network 142 can be trained to detect objects in particular weather conditions, such as when it is raining or foggy. Hence, point clouds output by the point cloud generator system 138 are particularly well-suited for detecting objects when it is raining or foggy.

Figure 3:
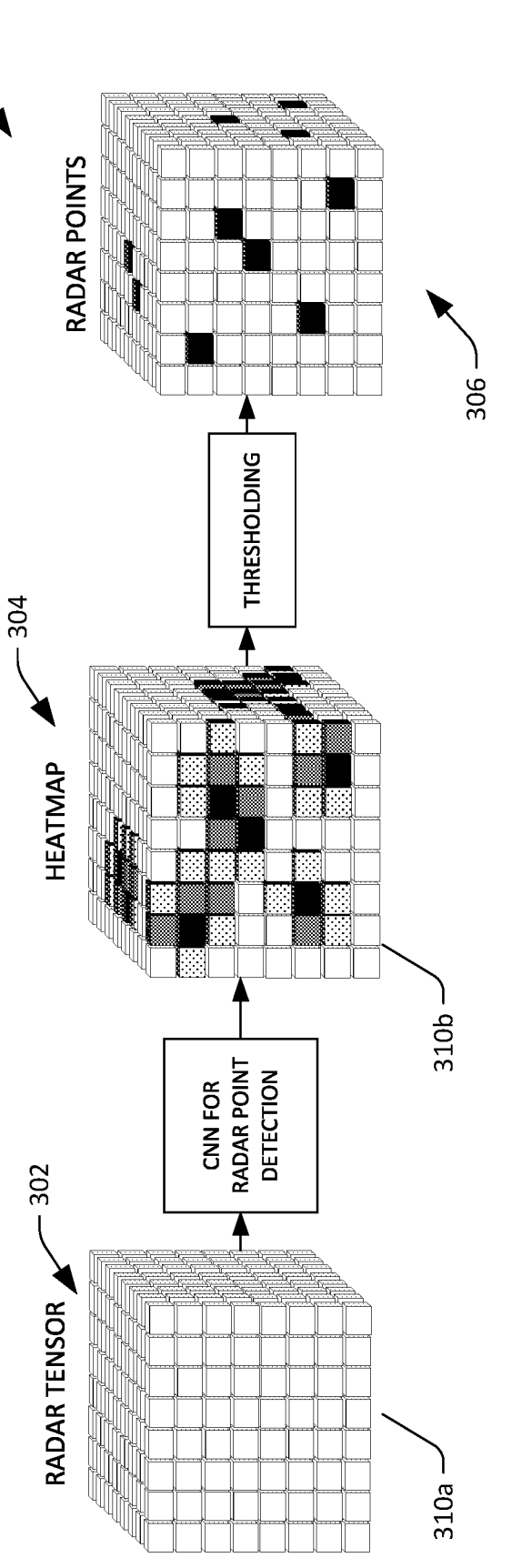
FIG. 3 depicts a radar tensor generated by a radar tensor generator module, a corresponding heatmap generated by a neural network, and an updated depiction of the radar tensor.

Referring now to FIG. 3, a graphical representation 300 depicting identification of bins in a radar tensor that correspond to valid radar hits is illustrated. As shown, the radar tensor generator module 140 generates a radar tensor 302 based upon radar signals detected by antenna(s) of the radar system 126. The radar tensor 302 includes a plurality of bins 310a, where the bins have energy values corresponding to multiple dimensions, such as range, Doppler, and beam. In the illustrated embodiment, the radar tensor 302 is three-dimensional. However, as discussed above, the radar tensor 302 may include more dimensions than three.

The neural network 142 (which may be a CNN) receives the radar tensor 302 as input and generates a heatmap 304 based upon the radar tensor 302. The heatmap 304 comprises entries 310b, where the number of bins in the bins 310a is the same as the number of entries in the entries 310b. Put differently, the heatmap 304 has the same dimensionality as the radar tensor 302, such that there is a one-to-one correspondence between bins in the radar tensor 302 and entries in the heatmap 304. Values of entries of the heatmap 304 are indicative of likelihoods that energies in the bins of the radar tensor 302 represent valid radar hits.

The threshold module 144 receives the heatmap 304, and the threshold module 144 performs a thresholding analysis over the heatmap 304. The thresholding analysis includes comparing the values of entries in the heatmap 304 with threshold values respectively assigned to the entries; accordingly, different entries in the heatmap 304 may have different threshold values assigned thereto.

Based upon the thresholding analysis, the threshold module 144 identifies bins in the radar tensor 302 that have energy values that correspond to valid radar hits. A labeled radar tensor 306 is illustrated in FIG. 3, where bins of the radar tensor 302 identified by the threshold module 144 as including energy values that correspond to valid radar hits are highlighted. A point cloud is generated based upon energies in the identified bins. The process illustrated in FIG. 3 can be performed for each radar tensor generated by the radar system 126.

Figure 4:
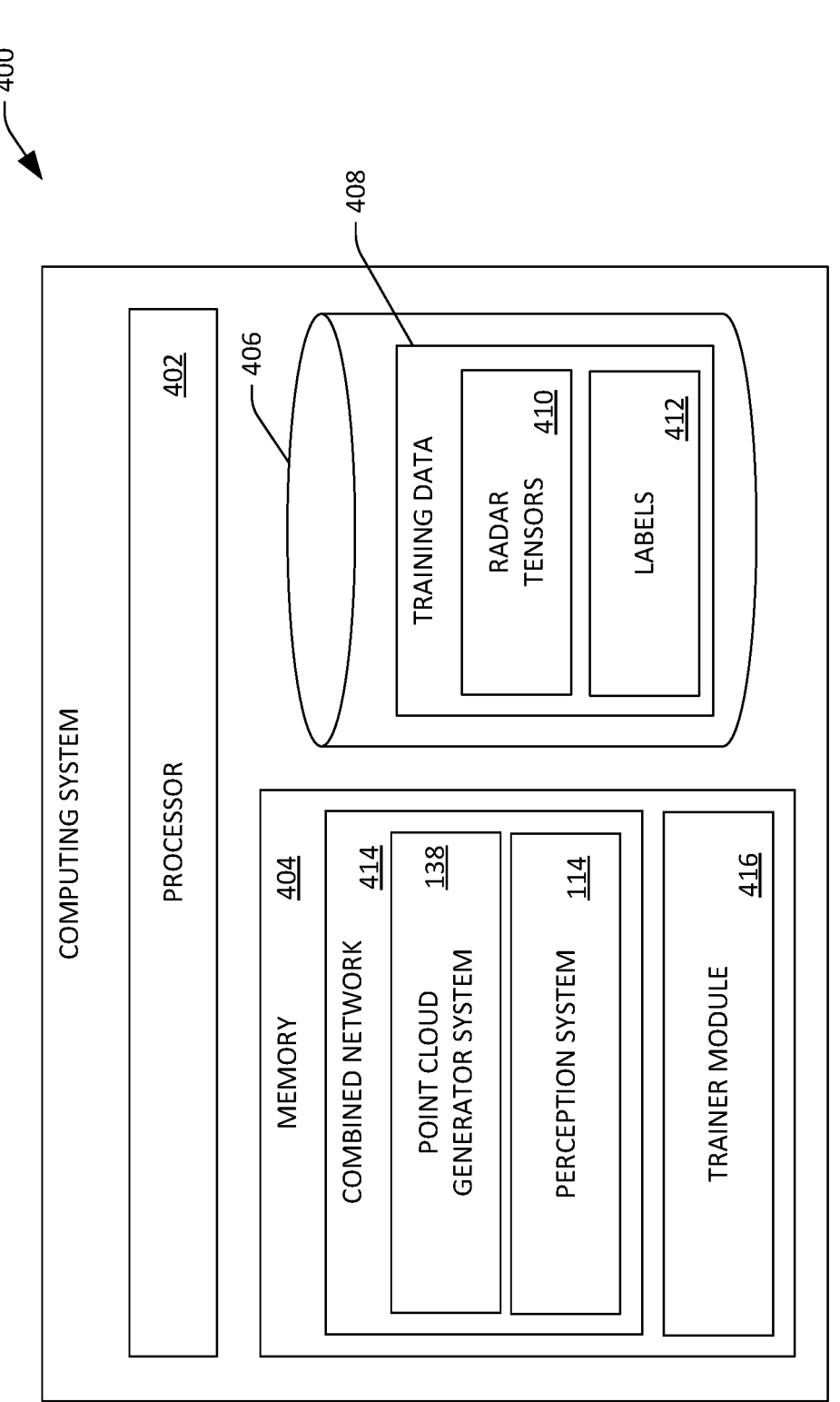
FIG. 4 is a functional block diagram of a computing system for jointly training a perception system of central processing system and a point cloud generator system of a radar sensor.

Referring now to FIG. 4, a functional block diagram of a computing system 400 that is configured to jointly train the point cloud generator system 138 and the perception system 114 is illustrated. For example, the computing system 400 can be a server computing device or cluster of server computing devices. The computing system 400 includes a processor 402 and memory 404, where the processor 402 executes instructions that are stored in the memory 404. The computing system 400 further includes a data store 406 that comprises training data 408. The training data 408 includes radar tensors 410 generated by radar systems and labels 412 assigned to such radar tensors 410, where the labels, for example, can identify objects represented in the radar tensors 410 (and optionally locations of such objects in a suitable coordinate system, such as cartesian space).

The memory 404 includes a combined neural network 414, where the combined neural network 414 comprises at least a portion of the point cloud generator system 138. For instance, when the training data 408 comprises the radar tensors 410, the combined neural network 414 need not include the radar tensor generator module 140. The combined neural network 414, however, includes the neural network 142 and the threshold module 144 in auto-differentiated form. The combined neural network 414 further comprises the perception system 114. As noted above, the perception system 114 includes a neural network, which, when trained, is configured to detect and identify objects based upon point clouds.

The memory 404 also includes a trainer module 416 that trains the combined neural network 414 based upon the training data 408. The trainer module 416 can utilize any suitable technologies in connection with training the combined neural network 414, including backpropagation and stochastic gradient descent (although other approaches are contemplated). During training of the combined neural network, weight matrices of the neural network 142, threshold values used by the threshold module 144, and weight matrices of the perception system 114 are jointly learned. After training, the trained neural network 142 and thresholding module 144 with the learned thresholds are deployed on radar systems (including the radar system 126) while the perception system 114 is deployed on central computing systems (such as the computing system 104). It is noted that, in theory, the combined neural network 414 can be executed on a centralized computing device; however, such approach is impractical, as radar tensors include a significant amount of data, requiring very high bandwidth interfaces to communicate the radar tensors from a radar system to a centralized computing system. Point clouds, however, are relatively small in size, and can be readily transmitted over a communications channel from the radar system to a centralized computing system.

FIGS. 5 and 6 illustrate exemplary methodologies relating to generation of point clouds by radar systems. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

With reference to FIG. 5, a flow diagram illustrating a methodology 500 performed by a radar system is illustrated. The methodology 500 starts at 502, and at 504 a radar tensor is generated based upon detected radar returns. As described above, the radar tensor is n-dimensional and includes a number of bins that comprise energy values corresponding to the detected radar returns. The dimensions of the radar tensor may include range, beam, and Doppler dimensions.

At 506, the radar tensor is provided as input to a neural network, where the neural network generates a heatmap based upon the radar tensor, and further where the heatmap has the same dimensionality as the radar tensor. The heatmap includes entries, where the entries have values computed therefore by the neural network. As described above, the neural network may be a CNN.

At 508, learned threshold values are applied to respective entries of the heatmap to identify bins in the radar tensor that correspond to valid radar hits. When a value in an entry of the heatmap exceeds the threshold value assigned to the entry, a bin in the data tensor that corresponds to an entry in the heatmap is identified as corresponding to a valid radar hit. When a value in an entry of the heatmap fails to exceed the threshold value assigned to the entry, a bin in the radar tensor that corresponds to the entry in the heatmap is identified as not corresponding to a valid radar hit.

At 510, a point cloud is generated based upon the bins identified as representing valid radar hits. At 512, the point cloud is transmitted to a computing system that executes a perception system, where the perception system detects and identifies an object in the environment surrounding the radar system based upon the point cloud. The methodology 500 completes at 514.

With reference to FIG. 6, a flow diagram illustrating an exemplary methodology 600 for jointly training the point cloud generator system 138 and the perception system 114 is illustrated. The methodology starts at 602, and at 604 the perception system 114 is obtained. More precisely, a first neural network that, once trained, is to be included in the perception system 114 is obtained.

At 606, the point cloud generator system 138 is obtained. More precisely, a second neural network that, once trained, is to be included in the point cloud generator system 138 and a thresholding algorithm that is to be included in the point cloud generator system 138 are obtained.

At 608, the perception system and the point cloud generator system are jointly trained such that weight matrices of the first neural network, thresholds of the thresholding algorithm, and weight matrices of the second neural network are jointly optimized. The perception system and the point cloud generator system are trained based upon training data that comprises radar tensors and labels assigned thereto, as described above. Upon being trained, the point cloud generator system is instantiated on a radar system that belongs to a larger system, such as an AV, an aircraft, a security system, etc. Further, the perception system is instantiated on a computing system that is in communication with the radar system. Hence, the radar system generates point clouds based upon detected radar signals and the computing system of the AV detects and identifies objects in the environment of the AV based upon the point clouds received from the radar system. The methodology 600 completes at 610.

Figure 7:
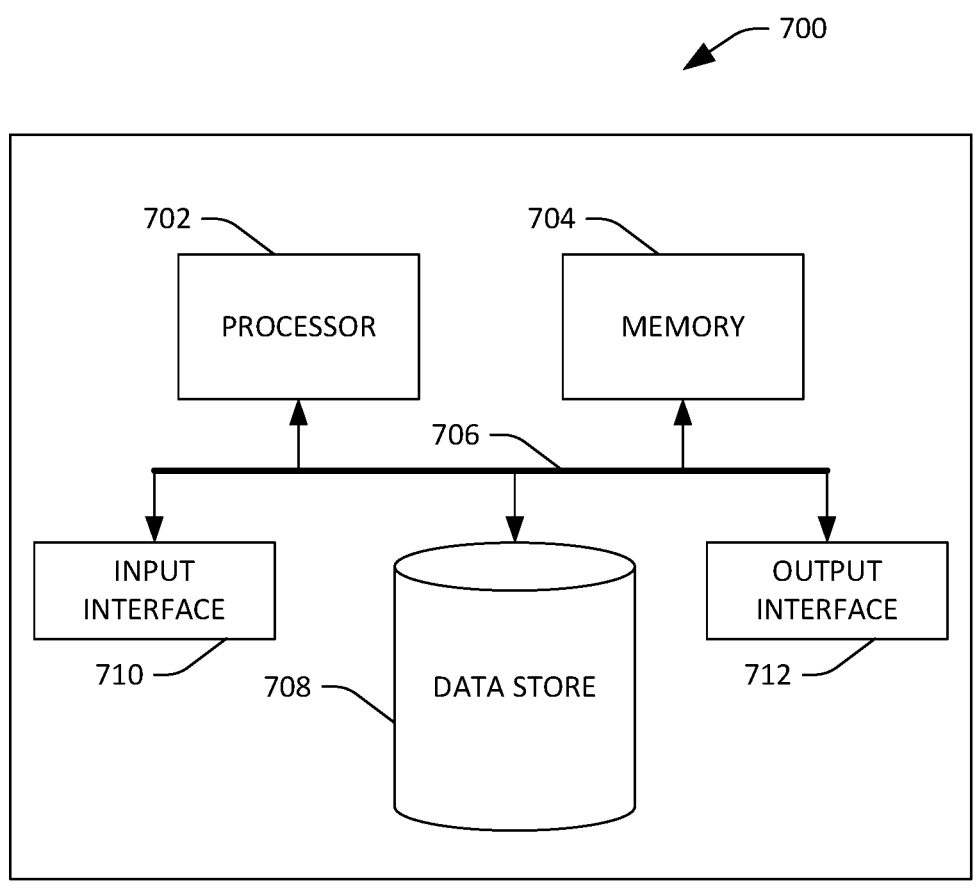
FIG. 7 is an exemplary computing system.

Referring now to FIG. 7, a high-level illustration of a computing device 700 that can be used in accordance with the systems and methodologies disclosed herein is illustrated. For instance, the computing device 700 may be used in a system that is configured to generate point clouds for use in connection with detecting and identifying objects in an environment of an AV. In another example, the computing device 700 may be used in a system that is configured to detect and identify objects based upon received point clouds. In yet another example, the computing device 700 may be used in a system that is configured to train neural networks. The computing device 700 includes at least one processor 702 that executes instructions that are stored in a memory 704. The processor 702 may be a central processing unit (CPU), a graphical processing unit (GPU), a field programmable gate array (FPGA), or any suitable combination of such computing devices. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store sensor data, radar tensors, point clouds, heatmaps, etc.

The computing device 700 additionally includes a data store 708 that is accessible by the processor 702 by way of the system bus 706. The data store 708 may include executable instructions, sensor data, radar tensors, point clouds, etc.

The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Systems and methods have been described herein in accordance with at least the examples set forth below.

(A1) In an aspect, a method performed by a radar system includes constructing a radar tensor based upon radar returns detected by the radar system, wherein the radar tensor has bins that comprise energy values. The method also includes providing the radar tensor as input to a neural network, where the neural network outputs a heatmap based upon the radar tensor, where the heatmap has entries that respectively correspond to the bins of the radar tensor, and further where the entries comprise values computed by the neural network based upon the energy values of the bins of the radar tensor. The method also includes comparing a value of an entry of the heatmap with a threshold value that is assigned to the entry of the heatmap, where the entry of the heatmap corresponds to a bin in the radar tensor. The method additionally includes assigning a label to the bin in the radar tensor based upon the comparing of the value of the entry of the heatmap with the threshold value. When the value of the entry of the heatmap exceeds the threshold value, the label assigned to the bin indicates that an energy value in the bin represents a valid radar hit. When the value of the entry of the heatmap fails to exceed the threshold value, the label assigned to the bin indicates that the energy value in the bin does not represent a valid radar hit. The method further includes generating a point cloud based upon the label assigned to the bin and transmitting the point cloud to a computing system that is configured to detect and identify objects in an environment of the radar system based upon the point cloud.

(A2) In some embodiments of the method of (A1), an autonomous vehicle (AV) includes the radar system, and the AV performs a driving maneuver based upon the point cloud.

(A3) In some embodiments of the method of at least one of (A1)-(A2), the neural network is a convolutional neural network.

(A4) In some embodiments of the method of at least one of (A1)-(A3), dimensions of the radar tensor include range, beam, and Doppler dimensions.

(A5) In some embodiments of the method of at least one of (A1)-(A4), the computing system includes a second neural network that is configured to receive the point cloud as input and generate output that is indicative of identities of objects in the environment of the radar system, where weight matrices of the neural network, the thresholds, and weight matrices of the second neural network are jointly learned during a training procedure.

(A6) In some embodiments of the method of at least one of (A1)-(A5), the acts of comparing and assigning are performed with respect to each entry in the heatmap and each entry in the radar tensor such that the bins of the radar tensor have labels assigned thereto, wherein the point cloud is generated based upon the labels.

(A7) In some embodiments of the method of at least one of (A1)-(A6), the neural network is trained with respect to a type of object to be detected and identified by the computing system.

(A8) In some embodiments of the method of at least one of (A1)-(A7), the radar tensor has at least three dimensions.

(A9) In some embodiments of the method of at least one of (A1)-(A8), processing circuitry is configured to perform the acts of constructing, providing, comparing, assigning, generating, and transmitting for each radar tensor generated by the radar system.

(B1) In another aspect, a radar system includes processing circuitry that is configured to perform at least one of the methods disclosed herein (e.g., at least one of (A1)-(A9)).

(C1) In yet another aspect, an AV includes a radar system that includes processing circuitry. The AV further includes a mechanical system and a computing system that is in communication with the radar system and the mechanical system. The processing circuitry is configured to perform at least one of the methods disclosed herein (e.g., at least one of (A1)-(A9)). In addition, the computing system is configured to perform a method that includes detecting an object in an environment of the AV based upon the point cloud and controlling the mechanical system of the AV based upon the object detected in the environment of the AV.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar system of an autonomous vehicle (AV) comprising:

processing circuitry of the radar system that is configured to perform acts comprising:

constructing a radar tensor based upon radar returns detected by the radar system, wherein the radar tensor has bins that comprise energy values;

providing the radar tensor as input to a neural network, wherein the neural network outputs a heatmap based upon the radar tensor, wherein the heatmap has entries that respectively correspond to the bins of the radar tensor, and further wherein the entries comprise values computed by the neural network based upon the energy values of the bins of the radar tensor;

comparing a value of an entry of the heatmap with a respective learned threshold value that is assigned to the entry of the heatmap, wherein different entries in the heatmap are assigned different learned threshold values, and wherein the learned threshold values are learned during a training procedure that jointly optimizes the learned threshold values, weights of the neural network, and weights of a second neural network of a computing system that is configured to detect and identify objects in an environment of the radar system based upon a point cloud using the second neural network;

assigning a label to the bin in the radar tensor based upon the comparing of the value of the entry of the heatmap with the respective learned threshold value, wherein:

when the value of the entry of the heatmap exceeds the respective learned threshold value, the label assigned to the bin indicates that an energy value in the bin represents a valid radar hit; and when the value of the entry of the heatmap fails to exceed the respective learned threshold value, the label assigned to the bin indicates that the energy value in the bin does not represent a valid radar hit;

generating the point cloud based upon energies in bins of the radar tensor identified as representing valid radar hits, wherein the point cloud is smaller in data size than the radar tensor; and transmitting the point cloud to the computing system, wherein the AV performs a driving maneuver based upon the point cloud.

2. The radar system of claim 1, wherein the neural network is a convolutional neural network.

3. The radar system of claim 1, wherein dimensions of the radar tensor include range, beam, and Doppler dimensions.

4. The radar system of claim 1, wherein the neural network is trained with respect to a specific perception task comprising at least one of detecting a particular type of object or detecting objects in a particular weather condition.

5. The radar system of claim 1, wherein the acts of comparing and assigning are performed with respect to each entry in the heatmap and each entry in the radar tensor such that the bins of the radar tensor have labels assigned thereto, wherein the point cloud is generated based upon the labels.

6. The radar system of claim 1, wherein the neural network is trained with respect to a type of object to be detected and identified by the computing system.

7. The radar system of claim 1, wherein the radar tensor has at least three dimensions.

8. The radar system of claim 1, wherein the processing circuitry is configured to perform the acts of constructing, providing, comparing, assigning, generating, and transmitting for each radar tensor generated by the radar system.

9. A method performed by a radar system of an autonomous vehicle (AV), the method comprising:

constructing a radar tensor based upon radar returns detected by the radar system, wherein the radar tensor has bins that comprise energy values;

providing the radar tensor as input to a neural network, wherein the neural network outputs a heatmap based upon the radar tensor, wherein the heatmap has entries that respectively correspond to the bins of the radar tensor, and further wherein the entries comprise values computed by the neural network based upon the energy values of the bins of the radar tensor;

comparing a value of an entry of the heatmap with a respective learned threshold value that is assigned to the entry of the heatmap, wherein different entries in the heatmap are assigned different learned threshold values, and wherein the learned threshold values are learned during a training procedure that jointly optimizes the learned threshold values, weights of the neural network, and weights of a second neural network of a computing system that is configured to detect and identify objects in an environment of the radar system based upon a point cloud using the second neural network;

assigning a label to the bin in the radar tensor based upon the comparing of the value of the entry of the heatmap with the respective learned threshold value, wherein:

when the value of the entry of the heatmap exceeds the respective learned threshold value, the label assigned to the bin indicates that an energy value in the bin represents a valid radar hit; and when the value of the entry of the heatmap fails to exceed the respective learned threshold, the label assigned to the bin indicates that the energy value in the bin does not represent a valid radar hit;

generating the point cloud based upon energies in bins of the radar tensor identified as representing valid radar hits, wherein the point cloud is smaller in data size than the radar tensor; and transmitting the point cloud to the computing system, wherein the AV performs a driving maneuver based upon the point cloud.

10. The method of claim 9, wherein the neural network is a convolutional neural network.

11. The method of claim 9, wherein dimensions of the radar tensor include range, beam, and Doppler dimensions.

12. The method of claim 9, wherein the neural network is trained with respect to a specific perception task comprising at least one of detecting a particular type of object or detecting objects in a particular weather condition.

13. The method of claim 9, wherein the comparing and assigning are performed with respect to each entry in the heatmap and each entry in the radar tensor such that the bins of the radar tensor have labels assigned thereto, wherein the point cloud is generated based upon the labels.

14. The method of claim 9, wherein the neural network is trained with respect to a type of object to be detected and identified by the computing system.

15. The method of claim 9, wherein the radar tensor has at least three dimensions.

16. The method of claim 9, wherein the constructing, providing, comparing, assigning, generating, and transmitting are performed for each radar frame generated by the radar system.

17. An autonomous vehicle (AV) comprising:

a radar system comprising processing circuitry;

a mechanical system; and a computing system that is in communication with the radar system and the mechanical system, wherein the processing circuitry of the radar system is configured to perform acts comprising:

constructing a radar tensor based upon radar returns detected by the radar system, wherein the radar tensor has bins that comprise energy values;

providing the radar tensor as input to a neural network, wherein the neural network outputs a heatmap based upon the radar tensor, wherein the heatmap has entries that respectively correspond to the bins of the radar tensor, and further wherein the entries comprise values computed by the neural network based upon the energy values of the bins of the radar tensor;

comparing a value of an entry of the heatmap with a respective learned threshold value that is assigned to the entry of the heatmap wherein different entries in the heatmap are assigned different learned threshold values, and wherein the learned threshold values are learned during a training procedure that jointly optimizes the learned threshold values, weights of the neural network, and weights of a second neural network of the computing system that is configured to detect and identify objects in an environment of the radar system based upon a point cloud using the second neural network;

assigning a label to the bin in the radar tensor based upon the comparing of the value of the entry of the heatmap with the respective learned threshold value, wherein:

when the value of the entry of the heatmap exceeds the respective learned threshold value, the label assigned to the bin indicates that an energy value in the bin represents a valid radar hit; and when the value of the entry of the heatmap fails to exceed the respective learned threshold, the label assigned to the bin indicates that the energy value in the bin does not represent a valid radar hit;

generating the point cloud based upon energies in bins of the radar tensor identified as representing valid radar hits, wherein the point cloud is smaller in data size than the radar tensor; and transmitting the point cloud to the computing system, and further wherein: the computing system is configured to perform acts comprising: detecting an object in an environment of the AV based upon the point cloud using the second neural network; and controlling the mechanical system of the AV based upon the object detected in the environment of the AV, wherein the AV performs a driving maneuver based upon the point cloud.

18. The AV of claim 17, wherein the neural network is a convolutional neural network.

* * * * *